March 14, 1933. V. J. BUTTERFIELD 1,901,082
HEATING APPARATUS FOR AUTOMOTIVE VEHICLES
Filed Feb. 20, 1929 3 Sheets-Sheet 1

INVENTOR
VERNON J. BUTTERFIELD
By
ATTORNEYS

March 14, 1933.    V. J. BUTTERFIELD    1,901,082
HEATING APPARATUS FOR AUTOMOTIVE VEHICLES
Filed Feb. 20, 1929    3 Sheets-Sheet 2
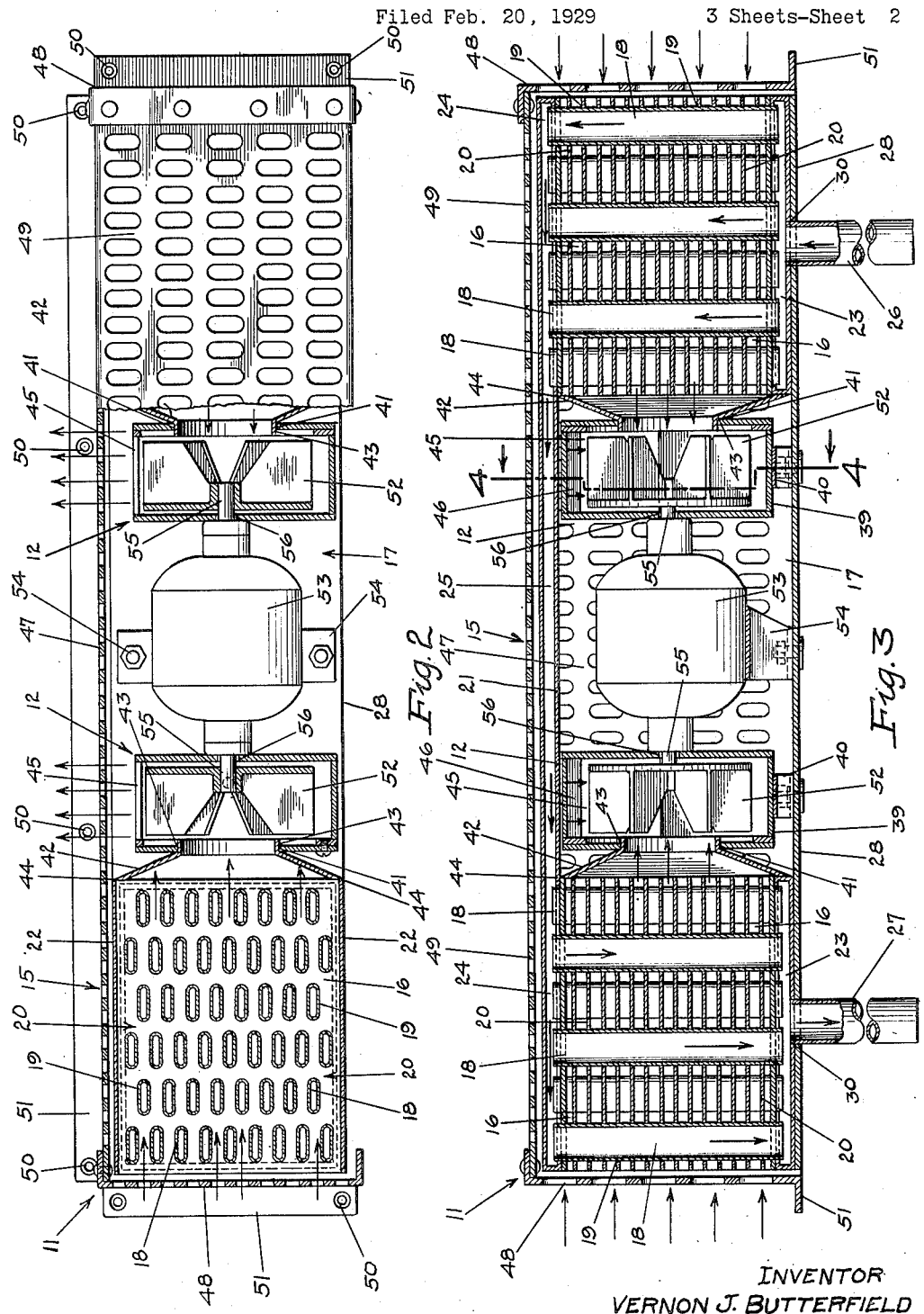
INVENTOR
VERNON J. BUTTERFIELD
BY
ATTORNEYS March 14, 1933. V. J. BUTTERFIELD 1,901,082
HEATING APPARATUS FOR AUTOMOTIVE VEHICLES
Filed Feb. 20, 1929 3 Sheets-Sheet 3
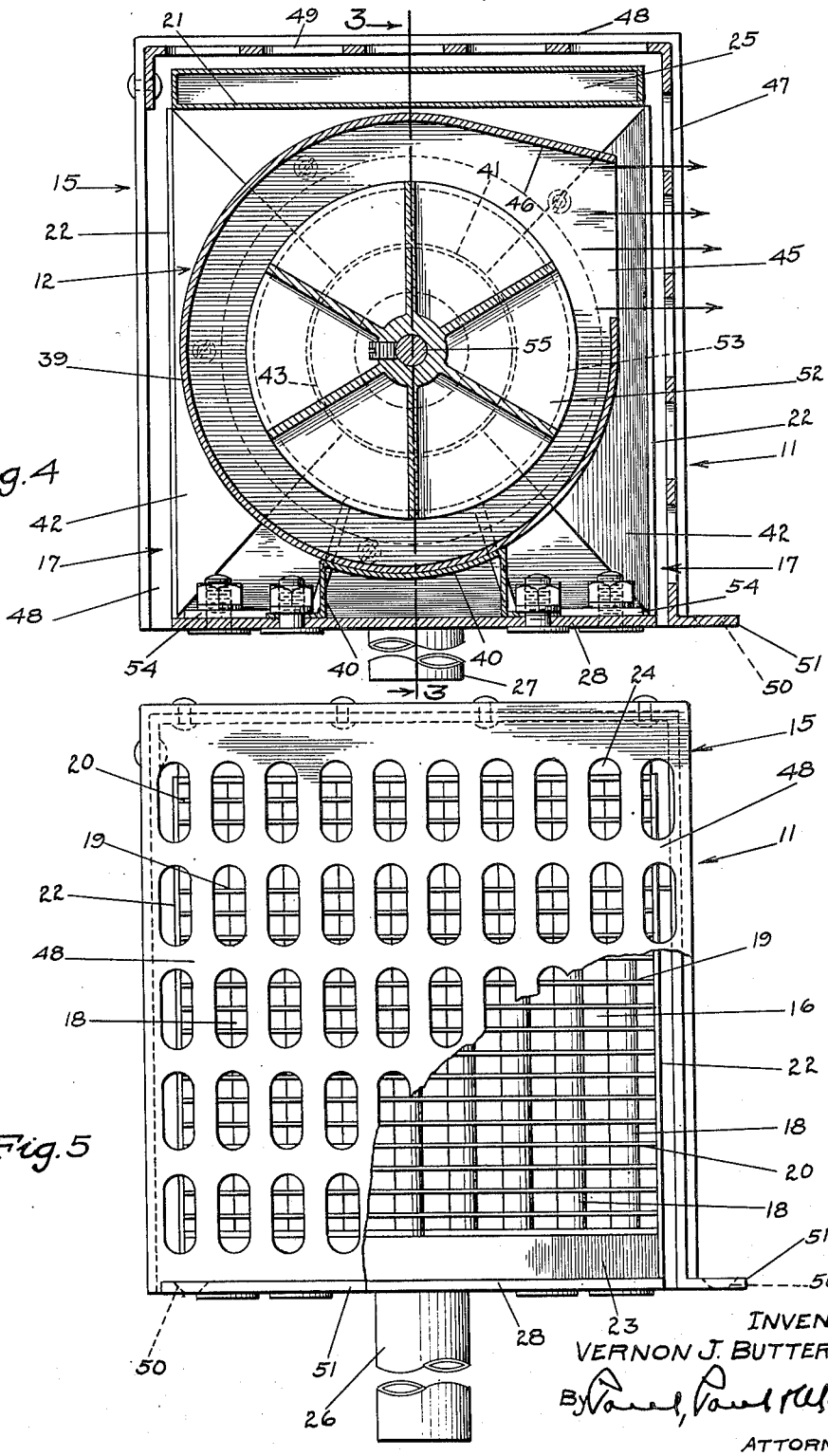
INVENTOR
VERNON J. BUTTERFIELD
ATTORNEYS Patented Mar. 14, 1933                                          1,901,082

UNITED STATES PATENT OFFICE

VERNON J. BUTTERFIELD, OF MINNEAPOLIS, MINNESOTA, ASSIGNOR TO TROPIC-AIRE, INCORPORATED, OF MINNEAPOLIS, MINNESOTA, A CORPORATION OF DELAWARE

HEATING APPARATUS FOR AUTOMOTIVE VEHICLES

Application filed February 20, 1929. Serial No. 341,403.

This invention relates to an apparatus for heating automotive vehicles and has more particular reference to a heater adapted to rest upon the floor of a vehicle body, as, for example, in the rear compartment of a taxicab or other passenger automobile.

An object of the invention is to provide an automotive vehicle heater, more especially adapted to rest upon a vehicle floor, which will include a heating element and means for forcibly circulating air in contact with the heating element, to thus cause the said air to be continuously heated and circulated within the vehicle body.

A further object is to provide an automotive vehicle heater, more especially adapted to rest upon a vehicle floor, which will include a heating element having a plurality of air-circulating passages associated with water-circulating passages connected in the usual water-circulating system of the vehicle engine, and means for withdrawing air from the interior of the vehicle body through the air-circulating passages of the heating element and for returning the withdrawn air back into the vehicle body interior, to thus cause the said air to be continuously heated and kept in circulation within the vehicle body.

And a still further object is to provide a heating apparatus for an automotive vehicle, including a heating element, an air withdrawing and returning means, and an operative association of the heating element with the air withdrawing and returning means and with the air-heating water-circulating system of the vehicle engine, each and all having novel and improved features and characteristics of construction as now to be fully described, it being understood that the disclosure herein is merely illustrative and intended in no way in a limiting sense, changes in details of construction and arrangement of parts being permissible so long as within the scope of the claims which follow.

In the accompanying drawings forming a part of this specification,

Fig. 2 is an enlarged plan view, partially sectioned and partially broken away, of the heating element and the air withdrawing and returning means of the improved apparatus;

Fig. 3 is an enlarged vertical, longitudinal sectional view of said heating element and air withdrawing and returning means, taken as on line 3—3 in Fig. 4, also disclosing the connections between the heating element and the vehicle engine water-circulating system;

Fig. 4 is a still further enlarged transverse sectional view, taken as on line 4—4 in Fig. 3; and Fig. 5 is an enlarged end view, partially broken away, of the heating element as seen from the right hand side of Fig. 2.

Figure 1:
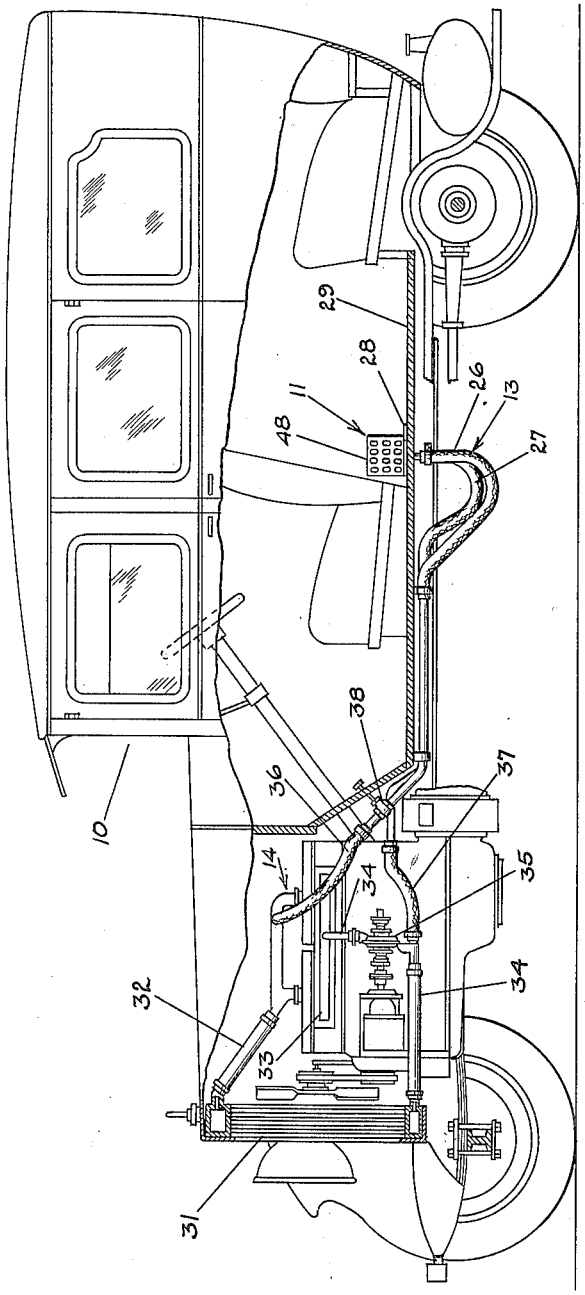
Fig. 1 is a side elevational view, partially sectioned and partially broken away, of an automotive vehicle, disclosing a heating apparatus, made in accordance with the present invention, associated with said vehicle, the heating element of said apparatus being situated upon the front portion of the floor of the rear compartment or tonneau of the vehicle.

With respect to the drawings and the numerals of reference thereon, 10 denotes an automotive vehicle equipped with a heating apparatus consisting, generally, of a heating element 11, disclosed as resting upon the vehicle floor, means 12, disclosed as housed by said heating element, for forcibly circulating air through the heating element, and connections 13 between the heating element and the water-circulating system 14 of the vehicle engine. As shown in Fig. 1, the heating element 11 is situated upon the front portion of the floor of the rear compartment or tonneau of the vehicle, adjacent the front seat, but said heating element could be otherwise situated in the vehicle body, as, for example, upon the floor at the rear of the rear compartment or tonneau, adjacent the rear seat, or in the front compartment of the vehicle.

The heating element 11 includes a housing 15 having horizontally disposed air-circulating passages 16 spaced apart by a chamber 17 housing the air forcing means 12 desirably situated at the midlength of the heating element. The housing 15 also has two sets of water-circulating tubes or passages 18, including a set for each set of air-circulating passages 16, connected in the water-circulating system 14 of the vehicle engine and intimately contacted with by the air-circulating passages 16. The water-circulating tubes or passages 18 of each set of water-circulating tubes or passages may be located in spaced apart apertures 19 in spaced apart plates 20, defining the air-circulating passages 16, to constitute spaced apart interior units of the heating element. Desirably, the tubes or passages 18 snugly fit the apertures in the plates, and after assembly of the tubes or passages with the plates, the resulting interior units are dipped in solder, in order to fix the plates in spaced relation along the tubes and to provide water-seals between the perforations of the outermost plates and the said tubes or passages adapted to preclude the entry of water to position between the plates and tubes. The inner ends of the air-circulating passages open to the chamber 17 housing the air forcing means 12, and a cover 21 for the said chamber is fitted and sealed against the adjacent end edges of opposite, uppermost plates 20, and against the side walls 22 of the interior units, to render the upper portion of the chamber 17 water-tight. A water-tight casing for each interior unit of the heating element includes a bottom chamber 23 fitted upon and sealed against the side and end marginal portions of the lowermost plate 20, the side walls 22 fitted and sealed against the side edges of said plates 20 and against the side edges of the bottom chamber 23, and a top chamber 24, common to both of said interior units, fitted and sealed against the side and end edge portions of the opposite, uppermost plates 20 and integral with or sealed to the side edges of the cover 21 and providing a water passage 25, defined by said top chamber 24 and said cover 21, between the spaced apart interior units of the heating element. A bottom chamber 23 (the one at the right in Fig. 3), which is situated beneath the lower ends of the tubes or passages 18 of the corresponding interior unit of the heating element, is communicated with by an inlet pipe 26, and communicates with the upper ends of the tubes or passages 18 of the opposite interior unit through the top chamber 24 and its water passage 25, while the bottom chamber 23 (the one at the left in Fig. 3) situated beneath the lower ends of the tubes or passages 18 of the said opposite interior unit, communicates with an outlet pipe 27. The casings for the interior units rest upon a floor plate 28, and said floor plate in turn rests upon and is secured to the vehicle floor 29 in any suitable manner. The inlet and outlet pipes 26 and 27 pass downwardly through apertures 30 in the floor plate and through apertures (not shown) in the vehicle floor.

The construction and arrangement above described provides air-circulating passages through the heating element, leading from the interior of the vehicle body inwardly through each of the air-circulating passages of the different interior units of the heating element, to the chamber 17 housing the air forcing means 12. Provision is made for causing hot water to flow through the heating element 11, through the inlet pipe 26, the water-chamber 23 at the right in Fig. 3, the adjacent water-circulating tubes or passages 18, the connecting passage 25, the adjacent water-circulating tubes or passages 18, the water-chamber 23 at the left in Fig. 3, and the outlet pipe 27, so that air entering the chamber 17 from the vehicle body interior through the air-circulating passages 16 will be heated upon reaching said chamber 17.

Numeral 31 represents the water-cooling radiator of the vehicle engine, 32 denotes a connection between the water-jacket 33 of said engine and said radiator, 34 designates a connection between the radiator and the water-jacket, and 35 indicates a pump in the connection 34 for forcing a flow of cooling-water through the water-circulating system of the engine, from the upper portion of the water-jacket through the connection 32 to the radiator and from the radiator through the connection 34 and pump 35 back to the water-jacket, in the usual manner. A connection 36 leads from the connection 32 to the inlet pipe 26, and a connection 37 leads from the outlet pipe 27 to a portion of the connection 34 in advance of the water pump 35. An adjustable shut-off valve 38 is situated in the connection 36 as disclosed. By regulation of this shut-off valve, a portion of the water of the water-circulating system can, evidently, be caused to flow from the water-jacket through the connection 36 and the intake pipe 26, through the heating element, and back to the water-jacket, through the outlet pipe 27 the connection 37, and the pump 35 (in the connection 34). Clearly, an arrangement (such as disclosed in the reissue patent to Caesar, No. 17,131, granted November 13, 1928) adapted to cause all of the water of the water-circulating system to flow through the heating element, could be substituted for the arrangement illustrated and just described. When the shut off valve 38 is closed, there will be no flow of water through the heating element, as will be obvious.

The air forcing means 12 includes two blower casings, designated 39, situated in spaced relation to each other in the chamber 17, one adjacent the inner ends of each set of air-circulating passages 16, and supported upon the floor plate 28 as indicated at 40. An opening 41 in each blower casing affords communication between the blower casing and the adjacent air-circulating passages 16, and a flared passage 42 is secured and fitted to each opening 41, as at 43, and to marginal portions of each interior unit of the heating element, as at 44, to direct all of the air passing through the air-circulating passages 16 into the blower casings.

A hot air outlet 45 from each blower casing 39 opens directly to the interior of the vehicle body and desirably includes a forwardly extending upper wall 46 slanting gently downward.

The housing 15 of the heating element may include a perforated forward wall 47 adjacent the hot air outlets 45, perforated end walls 48 adjacent the inlet ends of the air-circulating passages 16, and a perforated top wall 49 above the hot water chamber 24. The housing 15 may be secured to the vehicle floor in any convenient manner, as by screws adapted to be inserted through openings 50 in flanges 51 of said housing, and the walls of the housing may be joined to each other in any ordinary or preferred way.

An air blower 52 in each blower casing 39 is adapted to withdraw air from the interior of the vehicle body, through the adjacent air-circulating passages 16, and to return the heated air back into the vehicle body through the hot air outlets 45 from the blower casings. The gently slanting wall 46 of each hot air outlet 45 directs the heated air slightly downward as it enters the vehicle body, although the arrangement could be otherwise, if considered preferable.

An electric motor 53, situated in the chamber 17 between the blower casings 39 and supported upon the floor plate 28 as indicated at 54, includes oppositely extending motor shafts 55 entering the blower casings 39 through openings 56 in the adjacent walls of said blower casings and fixedly supporting the air blowers 52. A motor of variant type could be substituted for the electric motor disclosed.

Adjustment of the shut-off valve 38 regulates the amount of hot water allowed to flow through the heating element when the pump 35 is operating, and adjustment of the speed of rotation of the blowers 52 regulates the amount of air withdrawn from the vehicle body through the air-circulating passages 16 and pushed back into the vehicle body through the hot air outlets 45. Evidently, when the blower 52 is in operation, the air within the vehicle body is caused to be continuously circulated, through the heating element 11 and the air forcing or withdrawing and returning means 12, to thus be heated by the hot water flowing through the water-circulating tubes or passages 18 and the hot water chambers 23 and 24 of the said heating element. When the shut-off valve 38 is closed, so that no hot water is circulating through the heating element, the blowers 52 can keep the air within the vehicle body in circulation without heating said air. The rate of circulation of air through the air-circulating passages 16 determines the rate at which heat is absorbed from the hot water flowing through the heating element. When the blowers 52 are put out of operation while the valve 38 is open and the pump 35 is operating to force water through the heating element, but a small amount of heat will be dissipated to the interior of the vehicle body from the heating element.

I claim as my invention:

1. In combination, a heating element adapted to be positioned in a closed body and including a plurality of sets of air-circulating passages, the air-circulating passages of each set having their outer portions open to said closed body and the inner portions of the air-circulating passages of the different sets being arranged in spaced apart relation, means for supplying heat to said air-circulating passages, and a plurality of air propelling means between said air-circulating passages of the different sets, each including a casing situated in communication with the inner portions of a set of air-circulating passages, there being an air passage affording communication between each casing and the interior of said closed body, and an air propeller in each casing, for withdrawing air from said closed body and for returning the withdrawn air back into said closed body, the said air propeller being adapted to cause the said withdrawn and returned air to travel through said air-circulating passages, to thus be heated and kept in continuous circulation within the closed body.

2. In combination, a heating element adapted to be positioned in a closed body and including a plurality of sets of air-circulating passages, the air-circulating passages of each set having their outer portions open to said closed body and the inner portions of the air-circulating passages of the different sets being arranged in spaced apart relation, means for supplying heat to said air-circulating passages, a plurality of separate air propelling means between said air-circulating passages of the different sets, each including a casing in communication with the inner portions of a set of air-circulating passages, there being an air passage affording communication between each casing and the interior of said closed body, an air propeller in each casing for withdrawing air from said closed body and for returning the withdrawn air back into said closed body, the said air propeller being adapted to cause the said withdrawn and returned air to travel through said air-circulating passages, and a motor between said casings and having oppositely extending shafts supporting said air propellers.

3. In combination, a heating element adapted to be positioned upon the floor of a vehicle body and including a plurality of sets of air-circulating passages, the air-circulating passages of each set having their outer portions open to the interior of said vehicle body and the inner portions of the air-circulating passages of the different sets being arranged in spaced apart relation, means for supplying heat to said air-circulating passages, a plurality of separate air propelling means between said air-circulating passages of the different sets, each including a casing adapted to be supported upon said vehicle floor and communicating with the inner portions of a set of air-circulating passages, there being an air passage affording communication between each casing and the interior of said vehicle body, an air propeller in each casing for withdrawing air from said vehicle body interior and for returning the withdrawn air back into the interior of said vehicle body, the said air propeller being adapted to cause the said withdrawn and returned air to travel through said air-circulating passages, and a motor adapted to be supported upon said vehicle floor situated between said casings and having oppositely extending shafts supporting said air propellers.

4. An automobile heater comprising an elongated casing having an open front and open sides, a pair of radiators disposed in spaced relation within said casing, an air blower adjacent the inner end of each of said radiators, and a motor in the space between said radiators for operating said air blowers to draw air into said casing through said open side and discharge said air from said casing through said open front.

5. An automobile heater comprising a casing having openings therein for the passage of air, a pair of radiators disposed in spaced relation within said casing and having air passageways communicating with certain of said openings, an air blower adjacent one end of each of said radiators, and a common means for operating said air blowers to draw air into said casing through certain of said openings and through said air passageways in said radiators and to discharge said air from said casing through others of said openings.

In witness whereof, I have hereunto set my hand this 13th day of February, 1929.

VERNON J. BUTTERFIELD.